United States Patent [19]

Schwinum et al.

[11] 4,102,844

[45] Jul. 25, 1978

[54] DIPPED ARTICLES OF RUBBER

[75] Inventors: Ernst Schwinum, Leichlingen; Heinz Hornig, Cologne; Martin Matner, Odenthal, all of Germany

[73] Assignee: Bayer Aktiengesellschaft, Germany

[21] Appl. No.: 688,236

[22] Filed: May 20, 1976

Related U.S. Application Data

[63] Continuation of Ser. No. 506,986, Sep. 18, 1974, abandoned.

[30] Foreign Application Priority Data

Sep. 22, 1973 [DE] Fed. Rep. of Germany ....... 2347755

[51] Int. Cl.$^2$ .............................................. B28B 1/38
[52] U.S. Cl. ...................... 260/29.7 T; 260/29.7 SQ; 260/29.7 UA; 260/29.7 W; 526/303; 526/317; 526/338; 526/342; 264/306
[58] Field of Search ....................... 264/301, 306, 307; 260/29.7 SQ, 29.7 T, 29.7 UA, 29.7 W; 526/338, 342, 303, 317

[56] References Cited

U.S. PATENT DOCUMENTS

| | | | |
|---|---|---|---|
| 2,959,821 | 11/1960 | Kolb | 264/306 |
| 3,411,982 | 11/1968 | Kavalir et al. | 264/306 |
| 3,756,974 | 9/1973 | Buchheim et al. | 260/29.7 T |
| 3,875,101 | 4/1975 | MacLeod | 260/29.7 T |

FOREIGN PATENT DOCUMENTS

| | | | |
|---|---|---|---|
| 740,498 | 8/1966 | Canada | 260/29.7 T |
| 1,014,227 | 12/1965 | United Kingdom | 260/29.7 T |

*Primary Examiner*—Robert F. White
*Assistant Examiner*—James R. Hall
*Attorney, Agent, or Firm*—Connolly and Hutz

[57] ABSTRACT

A method for the production of dipped articles of rubber latices, wherein rubber latices are used which have an average rubber-particle diameter of no more than 200 nm and contain a rubber having a Defo value of less than 2000, the rubber latices having been prepared by the polymerization of a monomer mixture of 85 to 50 parts by weight of butadiene and/or isoprene, 10 to 40 parts by weight of acrylonitrile or methacrylonitrile, 0 to 40 parts by weight of styrene, 0 to 10 parts by weight of acrylamide, methacrylamide and/or their methylol derivatives and 0.1 to 10 parts by weight of an $\alpha$-$\beta$-unsaturated carboxylic acid, in aqueous emulsion in the presence of 0.5 to 6.0% by weight, based on monomer, of an alkylaryl sulphonate and 0 to 5% by weight, based on monomer, of one or more other surface-active substances as emulsifier, at a pH-value below 7, and wherein the pH of the latex is adjusted to a value above 8 with an alkali hydroxide on completion of polymerization and the dipped article of rubber produced by said method.

5 Claims, No Drawings

DIPPED ARTICLES OF RUBBER

Cross Reference To Related Application

This application is a continuation of application Ser. No. 506,986 filed Sept. 18, 1974 and now abandoned.

The dip process is frequently used for the production of shaped articles, especially hollow bodies, from natural rubber latex or dispersions of film-forming synthetic polymers. In this process, a mould made of wood, glass, porcelain, metal or plastics is first dipped into a solution which coagulates rubber latex ("Koagulant" bath), and then into the natural rubber or synthetic rubber latex. A film of rubber is formed on the surface of the mould, as the rubber is precipitated from the latex by the coagulant adhering to the mould ("Koagulant" process). The articles produced by this process are referred to hereinafter as "dipped articles".

The thickness and surface quality of the rubber film are dependent to a large extent on the type of "Koagulant" bath and rubber latex. The latices used for the coagulation process are mainly natural rubber latex or latices of synthetic polymers, preferably polychloroprene, polyisoprene or butadiene-acrylonitrile copolymers. Dipped articles of butadiene-acrylonitrile copolymers are generally more resistant to oils, fats, and organic solvents than dipped articles of polychloroprene or natural rubber. For this reason, rubber gloves in particular are produced with advantage from butadiene-acrylonitrile copolymer latices.

The butadiene-acrylonitrile copolymer latices used to-date have insufficient coagulation properties and the films made therefrom have inadequate strength. It takes a long time to obtain sufficiently thick films, and the films have a rough surface. In addition, the wet gel strength of the films is far from satisfactory, and the limited tensile strength and tear resistance of the crosslinked films restrict the serviceability of the dipped articles.

It has now been found generally speaking, that dipped articles having a high tensile strength and tear resistance can be obtained from latices which are made from the monomers specified hereinafter by polymerisation in aqueous emulsions using radical formers as catalysts and alkylaryl sulphonates as emulsifiers at specific concentrations and pH-values which also have a specified particle size, and Defo value in the polymer, and by shifting the pH of the latex obtained into the alkaline range on completion of polymerisation.

The process for producing the dipped article of the present invention utilizes rubber latices have an average rubber-particle diameter of no more than 200 nm and contain a rubber with a Defo value of less than 2000, the rubber latex having been obtained by polymerising a mixture of 85 to 50 parts by weight of butadiene and/or isoprene, 10 to 40 parts by weight of acrylonitrile and/or methacrylonitrile, 0 to 40 parts by weight of styrene, 0 to 10 parts by weight of acrylamide, methacrylamide and/or methylol derivatives thereof and 0.1 to 10 parts by weight of one or more $\alpha,\beta$-unsaturated carboxylic acids, in aqueous emulsion in the presence of 0.5 to 6.0% by weight, based on total monomers, of an alkylaryl sulphonate and of 0 to 5 % by weight, based on total monomers, of one or more other surface-active substances as emulsifier at a pH value below 7, and adjusting the pH of the latex to above 8 with alkali hydroxide on completion of polymerisation.

With these latices, smooth films of adequate thickness are obtained on the moulds by the "Koagulant" process, these films having superior strength and tear resistance after vulcanisation.

The latices are prepared by conventional methods of emulsion copolymerisation at pH values in the acid range, normally at a pH value in the range of from 2.5 to 6.

It has proved to be advantageous to add the emulsifier either continuously or in portions during polymerisation.

Emulsifiers which contribute to favourable coagulation behaviour of the latex during processing are, in particular, alkali metal salts of alkylaryl sulphonates used in a quantity of no less than 0.5% by weight and no more than 6% by weight, based on total monomer. The alkyl chain of the emulsifier can be linear or branched and can contain from 4 to 18 carbon atoms. The aryl group may be based on a mononuclear or polynuclear aromatic hydrocarbon. The sodium salts of dodecylbenzene sulphonic acids are mentioned as one example. In addition to one or more emulsifiers of the alkylaryl sulphonate type, it is also possible to use other emulsifiers in quantities of up to 5.0% by weight, based on total monomer. Alkali metal sulphonates and sulphates of $C_{12} - C_{18}$ hydrocarbons, and non-ionic emulsifiers known for this purpose in the art, can be used as the additional emulsifiers.

Polymerisation is carried out in the presence of the usual initiators and modifiers at temperatures in the range of from 10° to 80° C. Organic peroxide compounds can be used as initiators in quantities of from 0.01 to 2.0% by weight, based on total monomer. Examples of suitable modifiers include aliphatic mercaptans and dithioxanthogenates used in quantities of from 0.01 to 5% by weight, based on total monomer.

Butadiene, isoprene and (meth)acrylonitrile and, to a lesser extent, styrene are used as the principal monomers. The use of excessive quantities of styrene and deficient quantities of (meth)acrylonitrile results in dipped articles having only a moderate resistance to solvents. Thus, polymer dispersions consisting solely of styrene and butadiene are unsuitable for certain applications.

The polymer dispersions can contain other reactive group-containing monomers in smaller quantities than the principal monomers referred to above. These additional monomers are essentially $\alpha,\beta$-unsaturated carboxylic acids and, optionally, carboxylic acid amides or reaction products of carboxylic acid amides. Examples of suitable, $\alpha,\beta$-unsaturated carboxylic acids include acrylic acid, methacrylic acid, maleic acid, fumaric acid and itaconic acid. In addition to acrylamide and methacrylamide, it is also possible to use their N-methylol compounds, ethers, ester or urethane derivatives.

Thus, the most favourable composition for the polymers is as follows: 85 to 50 parts by weight of butadiene units, 10 to 40 parts by weight of (meth)acrylonitrile units, 0 to 20 parts by weight of styrene units, 0.1 to 10 parts by weight of $\alpha,\beta$-unsaturated carboxylic acid units, and 0 to 10 parts by weight of (meth)acrylamide and/or methylol derivatives thereof.

Polymerisation is stopped after the required conversion has been obtained. Polymerisation can be stopped by adding substances of the kind which are able to break off any radicals present and to destroy activator residues, for example sodium hydrogen sulphite, sodium dithionite, rongalite, hydroxylamine, dialkylhydroxylamines, hydrazine or sodium dimethyl dithiocarbamate.

It is recommended to continue polymerisation up to the highest possible conversion. However, the Defo-value of the polymer should not be too high, because otherwise cracked, shrinking films are obtained during the dipping process. The upper limit has been found to be a value of 2000, particularly favourable properties being obtained with polymers having Defo-values in the range of from 500 to 2000. The Defo-value can be adjusted by suitably selecting the time at which polymerisation is stopped and the quantity and dosage of modifier.

Conventional stabilisers, preferably in dispersed form, are generally added to the latices in order to protect them against the effect of light, oxygen and ozone.

A further requirement for the production of dipped articles with optimum properties is an upper limit to the average particle size of the latex. Methods for adjusting particle size, for example by suitably selecting the type and concentration of emulsifier, are already known, cf. for example Houben-Weyl, "Methoden der organischen Chemie", Vol. XIV/1, Georg Thieme Verlag Stuttgart, 1961, pages 335 et seq and 375 et seq. Smooth films having high wet gel strengths are only obtained if the average particle diameter of the latex, as determined by the light scattering method, is less than 200 nm. On the other hand, handling properties are adversely affected by the high viscosity of the latex with overly small particle sizes in the commercially interesting concentration range of from about 35 to 60% by weight. Accordingly, a latex satisfying processability requirements should have an average particle size of no more than 200 nm, preferably in the range of from 70 to 200 nm.

The solids concentration of 35 to 60% by weight which the latex should have to provide both for favourable processibility and for adequate wall strengths of the dipped articles can be obtained by polymerising monomer emulsions of corresponding concentration or by increasing the concentration of a so-called thin latex by the evaporation of water, creaming or centrifuging.

Dipped articles with sufficiently thick walls and with a smooth surface can be obtained in short dipping times with the copolymer latices described above. The latices can also be extruded through nozzles into a coagulant bath, in which case it is possible to obtain endless articles (for example rubber filaments), the shape of which depending upon the shape of the nozzle.

The latex used for dipping is normally provided with additives which enable the article produced to be subsequently vulcanised (crosslinked). It is possible to obtain crosslinking by virtue of the carboxyl group content of the polymer. It is, however, also possible to add vulcanising agents such as sulphur, p-quinone dioxime, orthotolylbiguanide, N-cyclohexylethyl ammonium cyclohexyl ethyl dithiocarbamate, zinc-N-pentamethylene dithiocarbamate, zinc mercaptobenzthiazole, tetraethylthiuram disulphide; melamine-formaldehyde condensates, phenol-formaldehyde condensates or urea-formaldehyde condensates, dimethyldiphenyl thiuram disulphide, hexamethylene tetramine or sulphenamides. Unless they are soluble in water, the vulcanising agents are generally added to the latex in the form of aqueous suspensions. Quantities in the range of from 0.01 to 10% by weight, based on the solids content of the latex, are normally used. Vulcanisation is carried out over periods of 10 to 120 minutes at temperatures of from 50° to 200° C.

In many cases, the stability of the latex can be increased by adding protective colloids. Casein, cellulose derivatives or even synthetic polymers such as styrene/maleic acid ester copolymers or polyacrylic acid can be used for this purpose.

Surprisingly, it has been found that, provided the limit in regard to particle size and Defo plasticity are observed, the strength properties (tensile strength and tear resistance) and, hence, the utility value of the dipped article can be significantly increased by adjusting the pH-value of the latices polymerised in the acid range to a value above 8 with aqueous solutions of alkali metal hydroxides either before or during preparation of the mixture. According to the invention, potassium hydroxide or sodium hydroxide, for example, can be used for this purpose.

Metal salts are used as coagulants in the initial dipping solution. Divalent metal ions (calcium nitrate or calcium chloride) have proved to be particularly favourable, trivalent metal ions generally resulting in over-rapid coagulation. Ethanol, isopropanol, acetone, methanol and water are used as solvents either individually or in admixture with one another. Physical measuring methods:

Determining average particle diameter by the light-scattering method. Instrument: FICA-50-scattered-light photometer Evaluation according to Wesslau, corrected according to Mie. Makromolekulare Chemie 69 (1963), pages 213 et seq and 220 et seq. Defo testing: precipitating the latex with methanol, squeezing off the serum and washing with water, drying in hot air at 100° to 120° C in accordance with DIN 53 415.

The following Examples illustrate the invention.

PRODUCTION OF THE LATICES

EXAMPLE 1

The following components were introduced into a 250 liter VA-steel autoclave equipped with a stirrer, thermometer, inlet pipe and thermostabiliser:
91 kg of demineralised water,
0.700 kg of sodium dodecylbenzene sulphonate,
0.700 kg of the sodium salt of a condensation product of naphthalene-$\beta$-sulphonic acid and formaldehyde,
2.333 kg of methacrylic acid (90% pure), and
3.5 g of iron (II) sulphate.

Adjustment of the pH-value to 4.0 with aqueous ammonia was followed by the addition of
19.6 kg of acrylonitrile, and
0.350 kg of tertiary dodecylmercaptan The autoclave was then evacuated, filled with nitrogen and 48.3 kg of butadiene were introduced.

After heating to 22° C,
70 g of tertiary butylhydroperoxide (80%) in 700 g of acrylonitrile, and
70 g of formaldehyde sulphoxylate dissolved in 1400 g of demineralised water
were added for activation.

Concentration samples were taken at 1 hourly intervals. After a latex concentration of 20 g of solids per 100 ml (concentration by evaporation sample) had been reached,
280 g of sodium dodecylbenzene sulphonate, and
3.5 kg of demineralised water
were added.

The temperature was then increased to 30° C.

At latex concentration of 30 and 35 g, respectively, of solids per 100 ml (concentration by evaporation samples),
210 g of sodium dodecylbenzene sulphonate, and
3500 g of demineralised water
were added.

Polymerisation was stopped at a concentration of 39.2% by the addition of a solution of
82 g of diethylhydroxylamine (85%) in
2100 g of demineralised water.
2100 g of a 50% dispersion of an ageing protective agent of styrenised xylenol with a diphenylamine were added for stabilisation.

The latex was degassed in vacuo for 6 hours at 40° C in order to remove the residual monomers.

160 kg of an approximately 39% latex were obtained. The polymer had a Defo-value of 1650. The latex had an average particle diameter of 120 nm. Part of the latex was adjusted to pH 8.8 with 5% dilute potassium hydroxide: latex 1. Another part of the latex is adjusted to pH 8.9 with dilute aqueous ammonia: comparison latex A.

EXAMPLE 2

The following solution was introduced into a 40 liter capacity VA-steel autoclave equipped with a stirrer, thermometer, inlet pipe and thermostabiliser:
12.0 kg of demineralised water,
50 g of sodium dodecylbenzene sulphonate (75%),
50 g of sodium diisobutylnaphthalene sulphonate,
0.5 g of iron (II) sulphate, and
40 g of acrylic acid.

The pH-value was then adjusted to 4.2 with 10% sodium hydroxide solution, followed by the addition of
280 g of methacrylonitrile, and
7 g of n-dodecylmercaptan The autoclave was then rinsed with nitrogen, followed by the addition of
680 g of isoprene.

The contents of the autoclave were heated to 30° C, followed by the addition of
100 g of p-menthane hydroperoxide, and
20 g of formaldehyde sulphoxylate dissolved in
200 g of demineralised water.

Immediately after the onset of the reaction, the following solutions were uniformly added over a period of 4 hours:
1.
6.120 kg of isoprene,
2.520 kg of methacrylonitrile,
360 g of acrylic acid, and
63 g of n-dodecylmercaptan.
2.
8.0 kg of demineralised water,
200 g of sodium dodecylbenzene sulphonate,
30 g of formaldehyde sulphoxylate, and
50 g of sodium diisobutylnaphthalene sulphonate.

The temperature was maintained at 30° C and concentration samples were removed at hourly intervals.

15 minutes after the end of the previous addition,
20 g of n-dodecylmercaptan, and
50 g of methacrylonitrile
were added.

Polymerisation is carried out at 35° C up to a concentration of 32 g of solids per 100 ml of latex, after which the reaction was stopped by the addition of
40 g of sodium perthiocarbonate (25 %), and
200 g of demineralised water,
and the latex was stabilised with
240 g of a 50% dispersion of a phenolic antioxidant.

The latex was degassed for 4 hours at 45° C in order to remove residual monomers. 28 kg of an approximately 30% latex were obtained.

A solution of 40 g of sodium alginate in 5 liter of desalted water was then added to the latex. After 2 days, a thick latex having a solids content of approximately 50% was separated off from the serum and adjusted to pH 9.0 with 5% sodium hydroxide solution: latex 2. The polymer had a Defo value of 1800. The latex had an average particle diameter of 150 nm.

EXAMPLE 3

The procedure was as described in Example 1, except that tert.-dodecylmercaptan (120 g) was used as regulator and polymerisation was carried out at a temperature of 40° C.

150 kg of a 40% latex having a Defo value of 4,000 and an average particle diameter of 100 nm were obtained. After adjustment of the pH-value to 9.3 with 5% potassium hydroxide solution: comparison latex B.

EXAMPLE 4

The procedure was as described in Example 2, but with 10 g of sodium dodecylbenzene sulphonate,
100 g of a sodium salt of the condensation products of naphthalene-β-sulphonic acid and formaldehyde in the autoclave, and
100 g of sodium dodecylbenzene sulphonate,
50 g of the sodium salt of the condensation product of naphthalene-β-sulphonic acid and formaldehyde in the aqueous input.

A thick latex having a solids content of 46% was obtained after creaming and adjustment of the pH to 9.2 with sodium hydroxide. The latex had a Defo value of 2000 and an average particle size of 230 nm: comparison latex C.

Production of dipped articles

The latices produced in accordance with Examples 1 to 5 were used as follows for the production of dipped articles by the coagulation process:

A porecelain glove mould preheated to about 50° - 80° C was dipped into an aqueous, 50% calcium nitrate solution. After drying in air, the mould was dipped into the latex, removed from the latex after 30 minutes, dried at 70° C and vulcanized for 65 minutes at 105° C. The rubber latex was prepared by adding the necessary vulcanizing agents and standing in air for 24 hours.

The results are shown in the following Table:

Table

| Latex according to Ex. No. | Tensile strength | | Tear resistance | | Appearance of the film Mixture 1 and Mixture 2 |
|---|---|---|---|---|---|
| | Mixture 1 | Mixture 2 | Mixture 1 | Mixture 2 | |
| 1 | 210 | 230 | 30 | 32 | uniform |
| 2 | 230 | 250 | 33 | 35 | " |
| A | 183 | 178 | 22 | 26 | " |
| B | 160 | 115 | 18 | 15 | non-uniform, cracked |
| C | 172 | 165 | 19 | 17 | non-uniform |

Latex mixtures 1 and 2 had the following compositions:

Mixture 1
| | | | |
|---|---|---|---|
| (a) | 100 | parts by weight of dry rubber | |
| (b) | 2.5 | parts by weight of active zinc oxide | dispersed in 12.2 parts by weight of a 5% aqueous Vultamol®-solution |
| | 1.5 | parts by weight of colloidal sulphur 95 | |
| | 0.8 | parts by weight of Vulkacit LDA | |
| | 5.0 | parts by weight of glycine (10%) | |
| | 2.0 | parts by weight of Bayertitan R-FKD | |
| | 0.2 | parts by weight of dye (for example Vulkanosol®) | |

Mixture 2
| | | | |
|---|---|---|---|
| (a) | 100 | parts by weight of dry rubber | |
| (b) | 1.5 | parts by weight of zinc oxide RS | dispersed in 9.8 parts by weight of a 5% aqueous Vultamol®-solution |
| | 1.5 | parts by weight of colloidal sulphur 95 | |
| | 1.0 | part by weight of Acrafix CN (55%) | |
| | 0.6 | part by weight of Vulkacit LDA | |
| | 0.4 | part by weight of Vulkacit ZP | |
| | 0.4 | part by weight of Vulkacit ZM | |
| | 2.0 | parts by weight of Bayertitan-R-FKD | |
| | 0.2 | part by weight of coloured pigment (for example Vulkanosol®) | |

We claim:

1. A dipped article produced by the process which comprises dipping a mould in a coagulant and then in a rubber latex to thereby form a film of precipitated rubber on the surface of the coagulant coated mould and subsequently vulcanizing said precipitated rubber to form a dipped article, said rubber latex having an average rubber particle diameter of up to 200 nm, a solids content of 35 to 60% by weight, and a Defo value of less than 2,000 and having been prepared by polymerizing a monomer mixture consisting of
   (a) 85 to 50 parts by weight of at least one member selected from the group consisting of butadiene and isoprene,
   (b) 10 to 40 parts by weight of acrylonitrile or methacrylonitrile,
   (c) 0 to 40 parts by weight of styrene,
   (d) 0 to 10 parts by weight of at least one member selected from the group consisting of acrylamide, methacrylamide and their methylol derivatives and
   (e) 0.1 to 10 parts by weight of an $\alpha,\beta$-unsaturated carboxylic acid, in aqueous emulsion in the presence of
      (i) 0.5 to 6.0% by weight, based on the monomer mixture weight, of an alkarylsulphonate and
      (ii) 0 to 5% by weight, based on the monomer mixture weight, of at least one surface active substance, at a pH below 7 and then adding on completion of polymerization of said monomer mixture, alkali metal hydroxide to adjust the pH to above 8.

2. The dipped article of claim 1 wherein said polymerization is carried out at a pH of from 2.5 to 6.

3. The dipped article of claim 1 wherein the polymerization is carried out at a temperature of from 10 to 80° C.

4. The dipped article of claim 1 wherein the polymerization is carried out in the presence of an initiator and a modifier.

5. The dipped article of claim 1 wherein the latex contains rubber with a Defo value of from 500 up to 2,000.

* * * * *